United States Patent [19]
Ferriss et al.

[11] Patent Number: 6,152,538
[45] Date of Patent: Nov. 28, 2000

[54] MECHANICAL LOCKS FOR WHEEL COVERS

[75] Inventors: David B. Ferriss, Novi; Rajakumar Israel, Berkley; David H. Johnson, Farmington Hills, all of Mich.

[73] Assignee: McKechnie Vehicle Components (USA), Inc., Troy, Mich.

[21] Appl. No.: 09/062,136

[22] Filed: Apr. 17, 1998

[51] Int. Cl.[7] .................................................. B60B 7/06
[52] U.S. Cl. ............................ 301/37.33; 301/37.34; 301/37.35
[58] Field of Search .................... 301/37.1, 37.24, 301/37.31, 37.32, 37.33, 37.34, 37.35, 37.36, 37.42, 37.43

[56] References Cited

U.S. PATENT DOCUMENTS

| | | | |
|---|---|---|---|
| 2,493,001 | 1/1950 | Lyon | 301/37.35 |
| 2,497,895 | 2/1950 | Lyon | 301/37.35 |
| 2,864,654 | 12/1958 | Hurd | 301/37.1 |
| 2,955,685 | 10/1960 | Lyon | 301/37.1 |
| 2,993,736 | 7/1961 | Lyon | 301/37.34 |
| 5,597,213 | 1/1997 | Chase | 301/37.43 |
| 5,829,843 | 11/1998 | Eikhoff | 301/37.36 X |

FOREIGN PATENT DOCUMENTS

| | | | |
|---|---|---|---|
| 310777 | 4/1989 | European Pat. Off. | 301/37.33 |
| 339513 | 11/1989 | European Pat. Off. | 301/37.33 |
| 3704384 | 8/1988 | Germany | 301/37.37 |

*Primary Examiner*—Russell D. Stormer
*Attorney, Agent, or Firm*—Bliss McGlynn, P.C.

[57] ABSTRACT

A mechanical locking system secures a wheel cover to a vehicular wheel. A rim lock includes a rim clasp which extends around at least a portion of the outer rim of the wheel. The rim clasp forces the wheel cover into abutting engagement with the outboard surface of the wheel. A hub lock includes a protrusion in the wheel cover which matingly engages a channel or recess in the wheel. The hub lock is located adjacent the hub portion of the wheel. The hub lock may include a spring to apply a force against the protrusion forcing the protrusion into the wheel.

9 Claims, 3 Drawing Sheets

MECHANICAL LOCKS FOR WHEEL COVERS

BACKGROUND OF THE INVENTION

1. Field of the Invention

The invention relates to wheel covers for vehicular wheels. More specifically, the invention relates to a locking mechanism for wheel covers to lock the wheel covers to the vehicular wheels.

2. Description of the Related Art

Wheel covers are aesthetic devices used to enhance the look of the wheels to which they are attached. Wheel covers are used because the manufacture, finish and mounting of a wheel cover to a wheel is less expensive than manufacturing a wheel having the same quality finish of a wheel cover. A chrome surface on a wheel cover is an inexpensive alternative to a chrome plated or polished wheel. In addition, wheel covers provide various types of appearances and styling variations, all of which may be combined with a single wheel design. The desirability of wheel covers is, however, directly proportional to the ability to inexpensively attach the wheel covers to the wheel permanently while adding little weight to the overall composite wheel.

One such attempt to attach a wheel cover to a wheel is disclosed is U.S. Pat. No. 4,596,425, issued to Hung. This reference discloses locking devices having a circular retaining member which acts in conjunction with a lock support. Each of the plurality of lock supports is secured to the wheel covers with screws. The wheel cover is then clipped on to the wheel using the double hook. Although this device provides a lock for a wheel cover about the periphery of the wheel cover, this lock does not provide a securing device near the hub of the wheel resulting in an inferior locking device. Further, this device includes many parts rendering it expensive to inventory, manufacture and assemble.

U.S. Pat. No. 5,366,278, issued to Brumfield, discloses a snap-on retention device for a wheel cover. The snap-on retention device wraps around the wheel rim and extends down along the wheel where a lower arm portion creates a spring-like attachment for a down turned lip which wraps around the wheel rim. Although this device locks the periphery of the wheel cover to the wheel rim of a wheel, it does not lock the wheel cover to the hub area of the wheel. Further, the clip is designed such that it is difficult to seal the areas between the wheel and the wheel cover from contaminants because the wheel cover is secured so far from the wheel.

U.S. Pat. No. 5,509,725, issued to Chiu, discloses a wheel cover assembly for wheels wherein the wheel cover includes locating blocks formed directly in the wheel cover. These locating blocks are used to lock the wheel cover to the wheel. The manufacture of the locating blocks increases the cost and weight of the wheel cover because they are formed integral with the wheel cover. Further, the wheel covers must be secured to the wheel in a specific orientation. More specifically, the clips and the locating blocks must be aligned. This adds time and costs to the assembly of a composite wheel. Therefore, there is a need in the art for an inexpensive mechanical lock used to secure a wheel cover to a wheel regardless of the orientation of the wheel cover with respect to the wheel and regardless of the type of wheel being covered.

SUMMARY OF THE INVENTION

A wheel cover assembly is disclosed covering a wheel having a hub receiving end and an outer rim. The wheel cover assembly includes a cover having an inner portion disposed adjacent the hub receiving end and an outer periphery disposed adjacent the outer rim. A hub lock secures the cover to the hub receiving portion of the wheel. A rim lock secures the cover to the outer rim of the wheel.

One advantage associated with the invention is the ability to secure a wheel cover to a wheel. Another advantage associated with the invention is the ability to secure a wheel cover to a wheel mechanically. Yet another advantage associated with the invention is the ability to secure a wheel cover to a wheel regardless of the orientation of the wheel cover with respect to the wheel. Still another advantage associated with the invention is the ability to secure a wheel cover to a wheel using a light-weight, inexpensive locking system.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
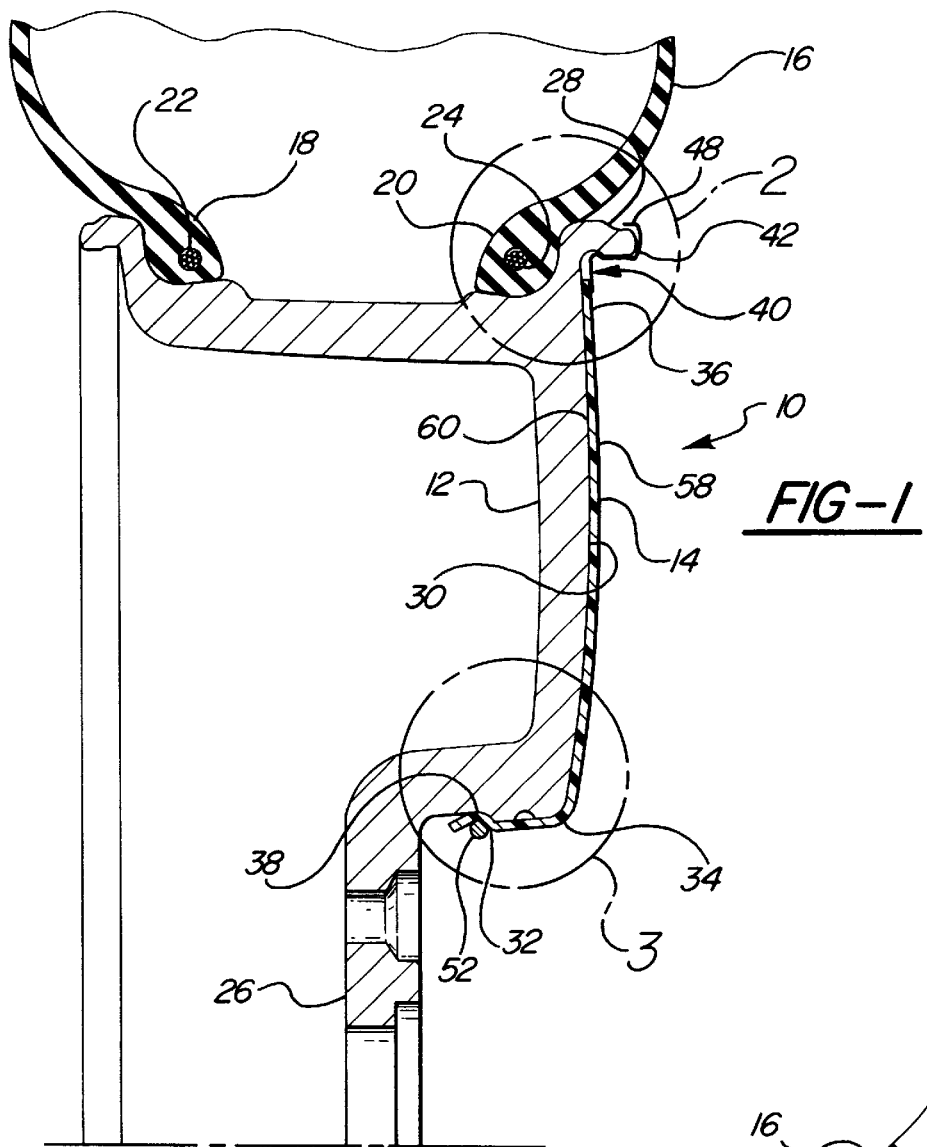
FIG. 1 is a cross-sectional side view partial cut away of a wheel and tire with the preferred embodiment of the invention securing a wheel cover to the wheel.

Referring to FIG. 1, a composite wheel is generally indicated at 10. The composite wheel 10 includes a vehicular wheel 12 and a wheel cover 14. Although an alloy wheel is shown representing the vehicular wheel 12, it may be appreciated by those skilled in the art that a steel wheel may also be used for the vehicular wheel 12. A tire 16 is seated within the vehicular wheel 12. The tire 16 has two tire beads 18, 20, each of which includes a wire cable 22, 24 extending therethrough.

The vehicular wheel 12 includes a hub receiving end 26 and an outer rim 28. The outer rim 28 receives the tire beads 18, 20 therein. The hub receiving end 26 receives a wheel hub (not shown) of a motor vehicle. A spider 30 extends between the outer rim 28 and the hub receiving end 26. The spider 30 may be of any shape or contour as is desired. Typically, the spider 30 has holes extending therethrough. The hub receiving end 26 includes a channel or recess 32. The channel 32, typically used with the alloy wheel shown in the Figures, will be discussed in greater detail subsequently.

The wheel cover or cover 14 extends over the spider 30. The cover 14 includes an inner portion 34 which is disposed adjacent the hub receiving end 26. The cover 14 also includes an outer periphery 36 which is disposed adjacent the outer rim 28. The cover 14 includes a protrusion 38 which is located in the inner portion 34 of the cover 14. The protrusion 38 is designed to be received by the channel 32 of the vehicular wheel 12. The protrusion 38 is spring biased into the channel 32 and provides a mechanical lock for the cover 14 to be secured to the vehicular wheel 12 at the inner portion 34 thereof. The protrusion 38 is a hub lock which secures the cover 14 to the hub receiving portion or end 26 of the vehicular wheel 12. Although shown not to, the cover 14 may extend radially inwardly to cover the hub portion.

Figure 2:
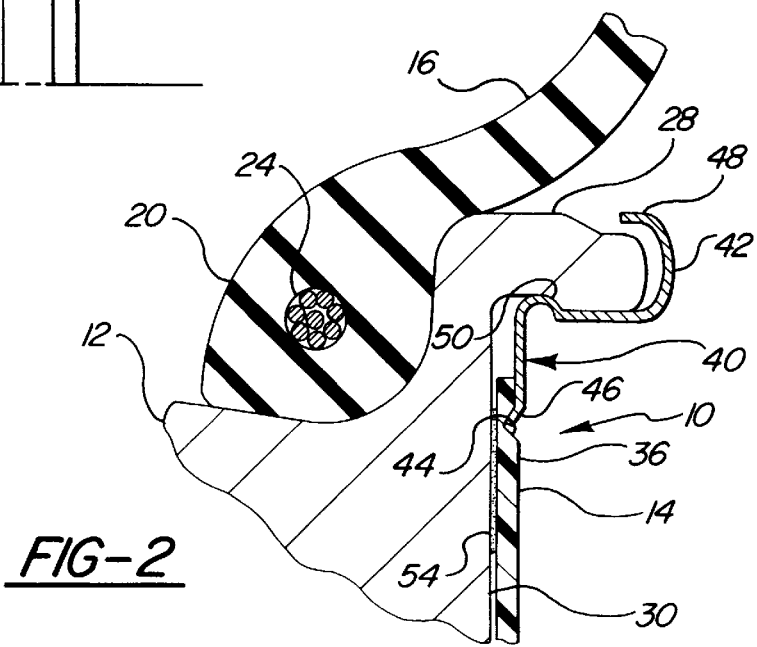
FIG. 2 is an enlarged view of Section 2 of FIG. 1.

A rim lock, generally shown at 40 in FIGS. 1 and 2, secures the cover 14 to the outer rim 28 of the vehicular wheel 12. The rim lock 40 includes a rim clasp 42 which engages the outer periphery 36 of the cover 14 and the outer rim 28 of the vehicular wheel 12. A similar rim lock, as disclosed in U.S. Pat. No. 5,368,370 which is hereby incorporated by reference, may be used in place of the rim lock 40. The cover 14 also includes a receiving channel 44 for receiving the rim clasp 42 therein. The rim clasp 42 includes a curved end 46 which matingly engages the receiving channel 44 of the cover 14.

The rim clasp 42 further includes a hook end 48 which extends around the outer rim 28 of the vehicular wheel 12. The hook end 48 wraps around a rim engaging portion 50 of the rim clasp 42 to cover the outer rim 28 of the vehicular wheel 12.

Figure 3:
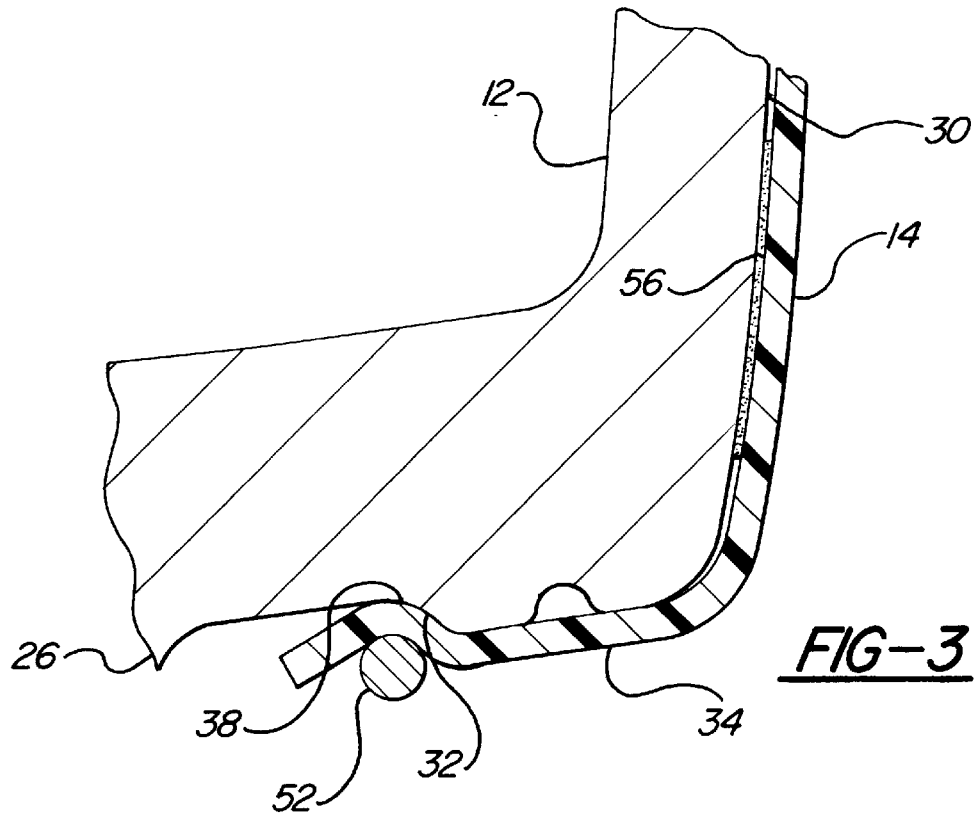
FIG. 3 is an enlarged view of Section 3 of FIG. 1.
Figure 4:
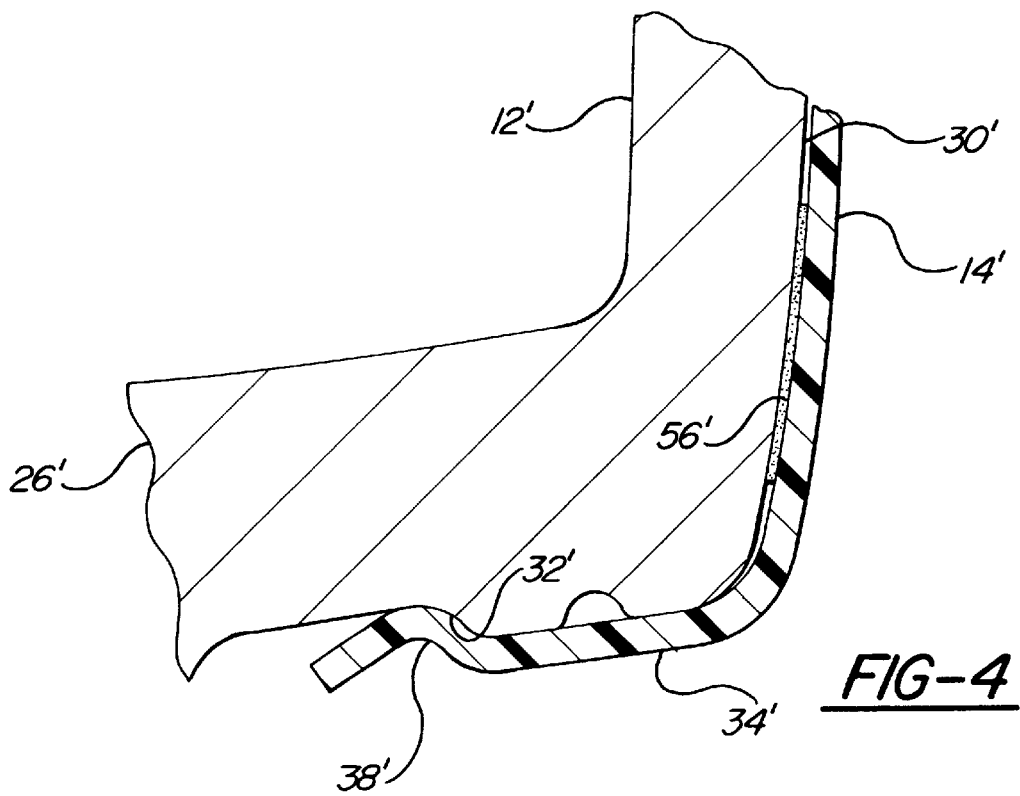
FIG. 4 is a second embodiment of the invention similar to the embodiment shown in Section 3 of FIG. 1.

In the embodiment shown in FIGS. 1 through 3, a spring 52 engages the protrusion 38 of the cover 14 to add an additional spring bias force to the force provided by the protrusion 38. In this embodiment, the spring 52 is circular in cross section. As may be seen in FIG. 4 wherein like primed numerals represent similar elements found in FIGS. 1 through 3, the spring 52 is not used in conjunction with the protrusion 38'. In this embodiment, the protrusion 38' is of sufficient strength to obviate the need of the spring 52.

A sealant 54, 56 may be placed between the cover 14 and the vehicular wheel 12 to prevent contaminants from collecting therebetween resulting in the reduction of corrosion of the outboard surface 58 of the wheel 12 and the inboard surface 60 of the cover 14. The sealant 54, 56 may be located around any opening of the cover 14 and the vehicular wheel 12 as is shown in the Figures. Alternatively, the sealant 54 may cover the entire outboard surface 58 of the wheel 12. Although the sealant 54, 56 may have adhesive qualities inherent in a sealant, the sealant 54, 56 is not required to operate as an adhesive as the rim 40 and hub 38 locks provide the necessary mechanical lock to maintain the wheel cover 14 in an engaged position with the vehicular wheel 12.

Figure 5:
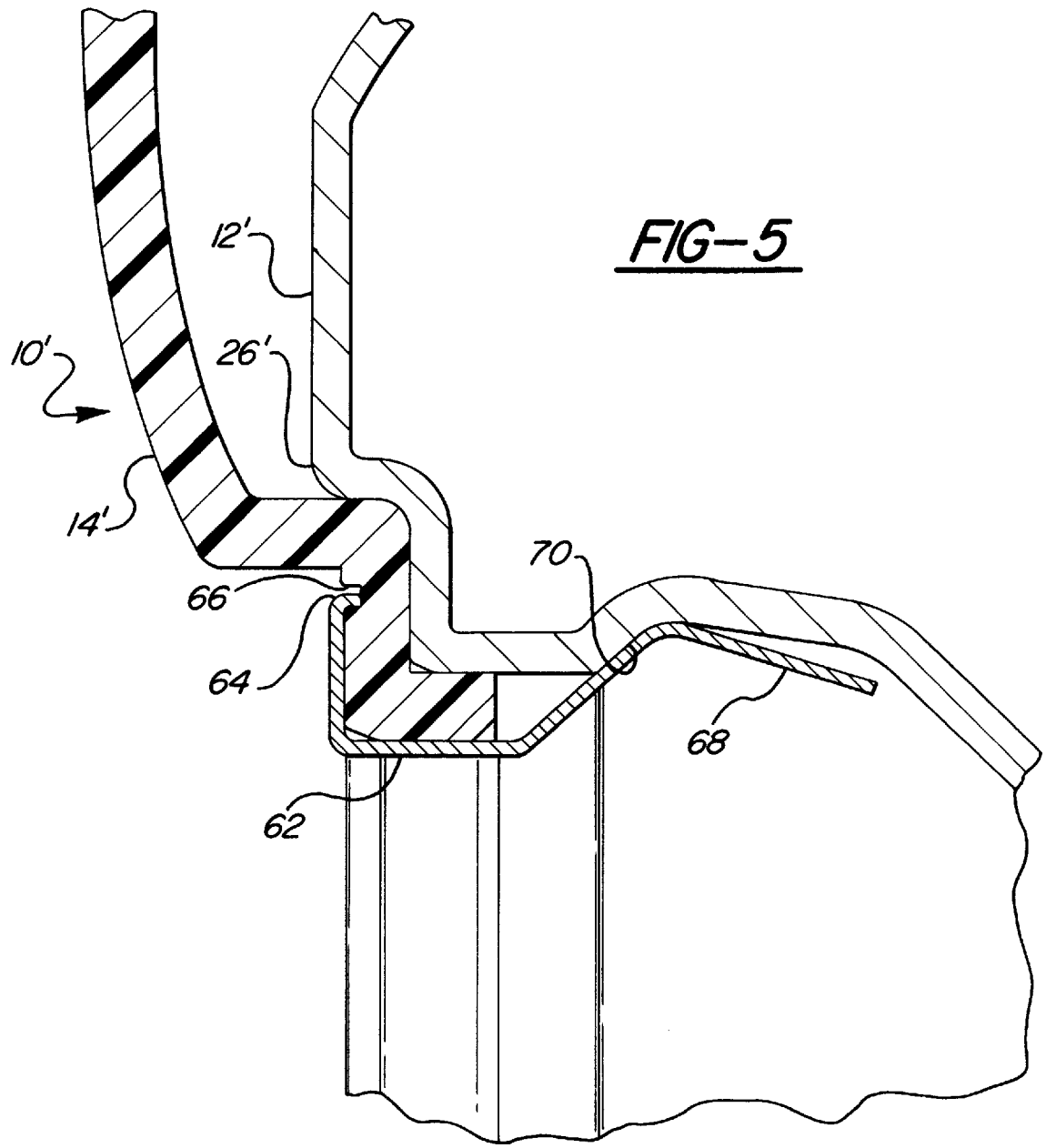
FIG. 5 is a side view partially cut away of a third embodiment of the invention.

Referring to FIG. 5, an alternative embodiment of the invention is shown at 10' wherein like primed numerals represent similar structures. The composite wheel 10' includes a vehicular wheel 12', shown partially cut away and in phantom. The wheel cover 14' is secured to the vehicular wheel 12' adjacent the hub receiving end 26' thereof. A clip 62 locks or holds the wheel cover 14' to the hub receiving end 26'. The clip 62 includes a cover end 64 which is received in a cover recess 66 and a wheel end 68 which abuts a surface 70 of the vehicular wheel 12'.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A wheel cover assembly for covering a wheel having a hub receiving end and an outer rim, said wheel cover assembly comprising:

a cover having an inner portion disposed adjacent the hub receiving end and an outer periphery disposed adjacent the outer rim, said outer periphery includes a receiving channel for receiving said rim clasp therein;

a hub lock securing said cover to the hub receiving portion of the wheel, said hub lock including a protrusion to engage the wheel and a spring engagable with said protrusion biasing said protrusion into the wheel;

a rim lock securing said cover to the outer rim of the wheel, said rim lock including a rim clasp engaging said outer periphery of said cover to the outer rim of the wheel.

2. A wheel cover assembly as set forth in claim 1 wherein said rim clasp includes a hook end extendable around the outer rim of the wheel.

3. A wheel cover assembly as set forth in claim 2 including a sealant extending between said cover and the wheel preventing contaminants from collecting therebetween.

4. A composite wheel comprising:

a wheel having a hub receiving end, an outer rim and a spider extending therebetween, said hub receiving end including a channel;

a cover extending over said spider, said cover having an inner portion disposed adjacent said hub receiving end and an outer periphery disposed adjacent said outer rim;

a hub lock securing said cover to said hub receiving end of said wheel, said hub lock including a protrusion to engage said wheel and a spring engagable with said protrusion biasing said protrusion into said wheel; and a rim lock securing said cover to said outer rim of said wheel.

5. A wheel cover assembly as set forth in claim 4 wherein said rim lock includes a rim clasp engaging said outer periphery of said cover to the outer rim of the wheel.

6. A wheel cover assembly as set forth in claim 5 wherein said outer periphery includes a receiving channel for receiving said rim clasp therein.

7. A wheel cover assembly as set forth in claim 6 wherein said rim clasp includes a hook end extendable around the outer rim of the wheel.

8. A wheel cover assembly as set forth in claim 7 including a sealant extending between said cover and the wheel preventing contaminants from collecting therebetween.

9. A wheel cover assembly for covering a wheel having a hub receiving end and an outer rim, said wheel cover assembly comprising:

a cover having an inner portion disposed adjacent the hub receiving end and an outer periphery disposed adjacent the outer rim;

a hub lock securing said cover to the hub receiving portion of the wheel, said hub lock including a protrusion to engage the wheel and a unitary spring structure circumscribing the hub for engaging said protrusion and biasing said protrusion into the wheel; and a rim lock securing said cover to the outer rim of the wheel.

* * * * *

UNITED STATES PATENT AND TRADEMARK OFFICE
CERTIFICATE OF CORRECTION

PATENT NO.   : 6,152,538
DATED        : November 28, 2000
INVENTOR(S)  : David B. Ferriss et al.

It is certified that error appears in the above-identified patent and that said Letters Patent is hereby corrected as shown below:

Column 4,
Line 21, delete "composite wheel" and insert therefor -- wheel cover assembly --.

Signed and Sealed this

Twenty-fourth Day of June, 2003

JAMES E. ROGAN
*Director of the United States Patent and Trademark Office*